United States Patent Office 3,027,159
Patented Mar. 27, 1962

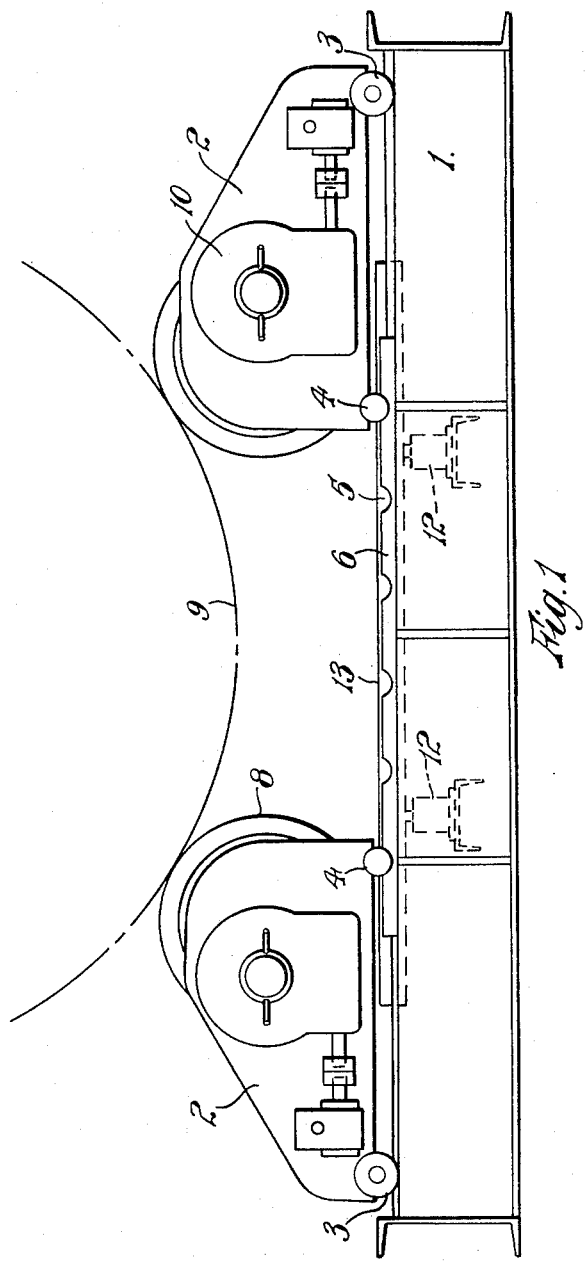

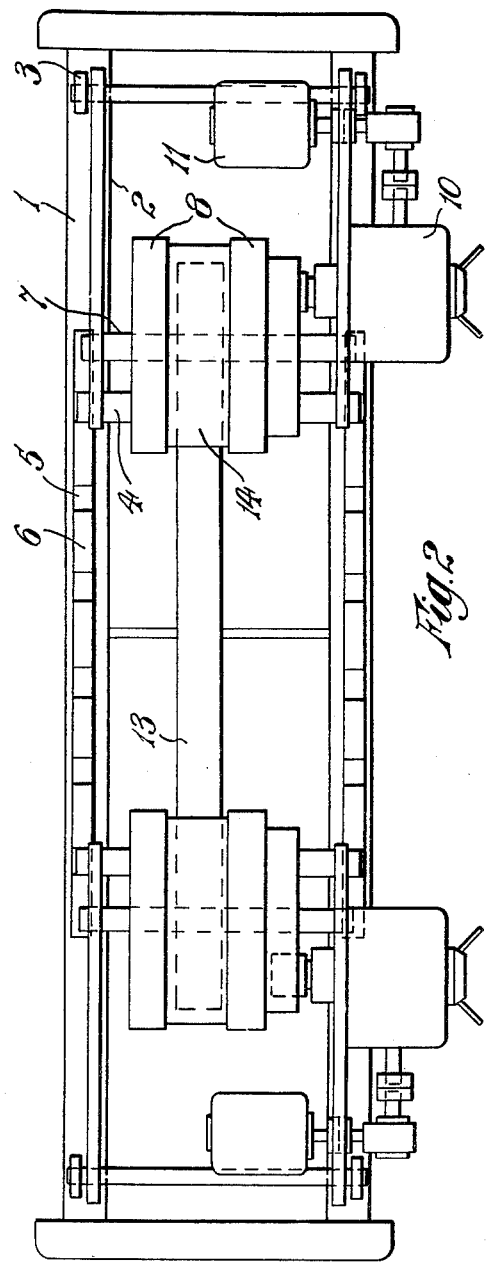

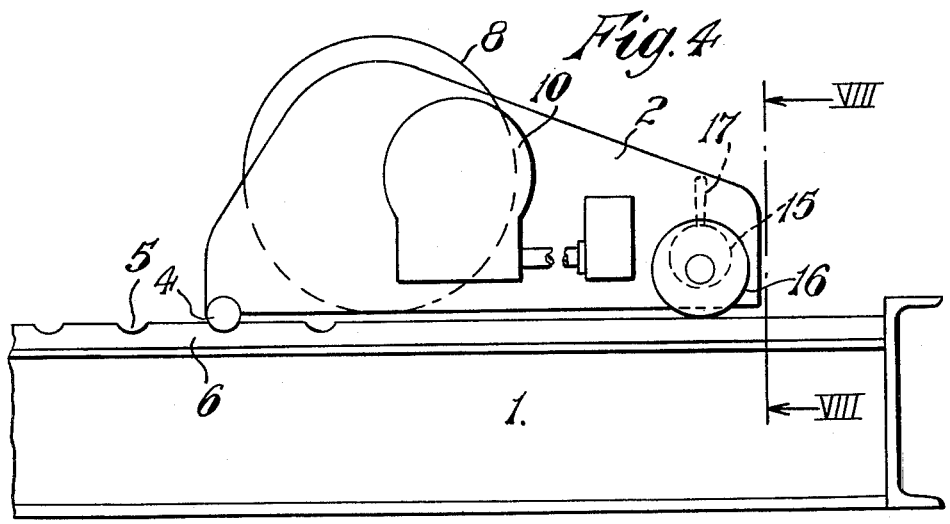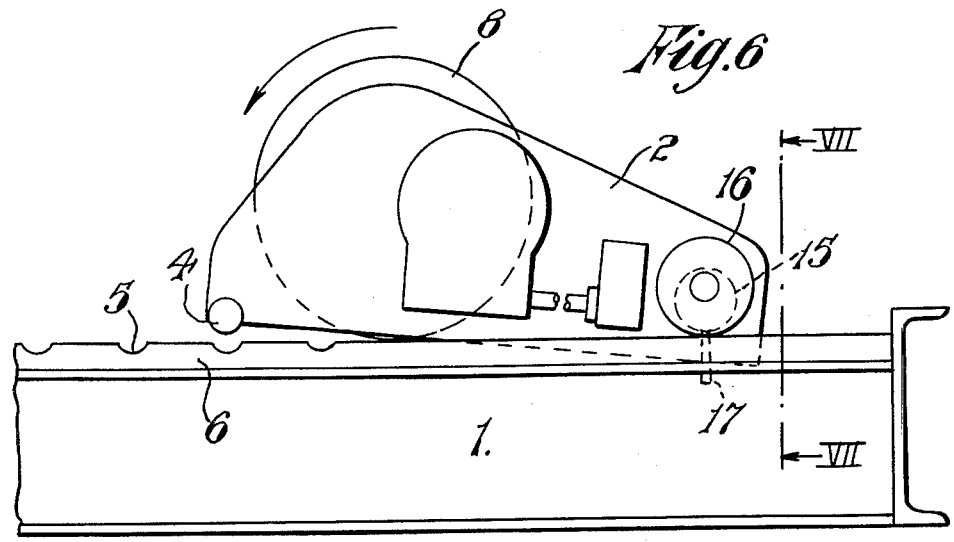

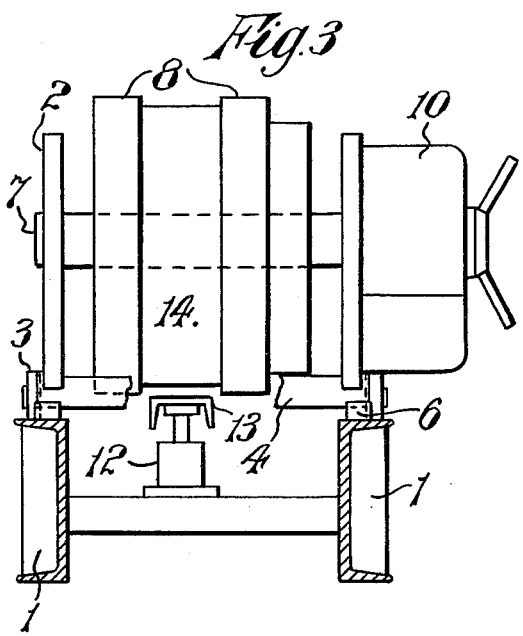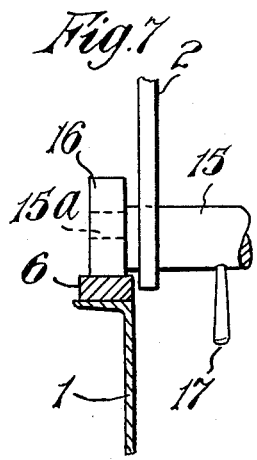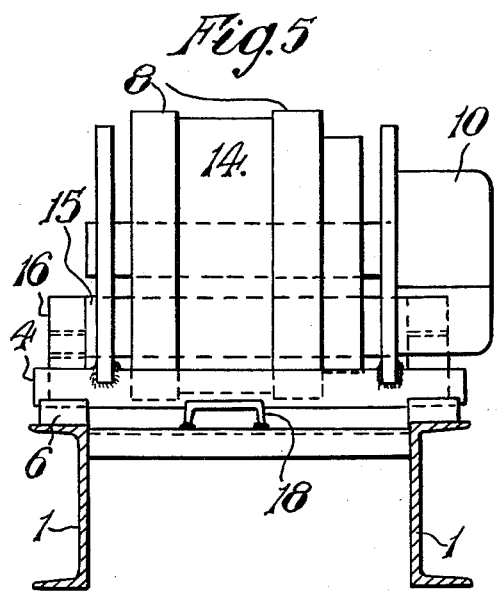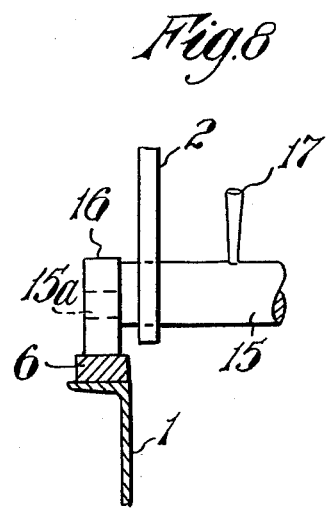

3,027,159
ROLLER APPARATUS FOR SUPPORTING AND ROTATING CYLINDRICAL OBJECTS
Herbert Yates, Kingsbury, London, England, assignor to Yates Plant Limited, London, England
Filed Oct. 20, 1959, Ser. No. 847,653
Claims priority, application Great Britain Oct. 24, 1958
9 Claims. (Cl. 269—177)

This invention relates to roller apparatus for supporting and rotating cylindrical objects, such as boilers and pipes, during welding or similar work or for examination or any other purpose.

For convenience in this specification, a cylindrical object to be supported and rotated will be called a "workpiece" and the roller apparatus as a whole will be called a "rotator" which is a name by which such apparatus, for large-size workpieces, is known.

The invention is applied to a rotator consisting of at least one pair of carriages, for parallel-axes rollers on and between which the workpiece rests axially parallel to to the rollers, and the object of the invention is to facilitate movement bodily of a carriage or carriages, in a direction transverse to the roller axes, for adjustment of the distance apart of carriages to suit workpieces of various sizes.

According to the invention, in a workpiece rotator comprising at least one pair of carriages bearing parallel-axes rollers on and between which a workpiece can rest axially parallel to the rollers, a track extending transversely to the roller axes is provided for engagement by at least one of said rollers as a wheel, by rotation of which the respective carriage can be moved along the track for adjustment of the position of that carriage with respect to another, and means are provided for effecting said engagement at will.

The invention thus enables a roller, or part thereof, on a roller carriage, and any drive provided for the roller, to be used not only for its main purpose of rotating a workpiece but also for adjusting movement of the carriage to suit the size of a workpiece.

In one construction of the invention, the track is a rail extending horizontally beneath the carriage, transversely to the roller axes, and is provided with lifting means, such as hydraulic jacks, by which the rail can be lifted into driving contact with a circumferential part of the roller so that on rotation the roller moves along the rail and thereby moves the carriage. Preferably, the carriage normally rests on a fixed bed with which it has interengaging means at intervals, for carriage-location during rotation of a workpiece, and the lift of the track rail is sufficient to raise the carriage from engagement with its bed before rotation of the roller to move the carriage.

In another construction, a fixed track rail extends horizontally beneath the carriage, transverse to the roller axis, and the carriage is normally supported above the track rail by means, such as a rotatable eccentric bearer, which enables the carriage to be lowered for a circumferential part of the roller to rest in driving contact on the fixed track rail. The lowering movement of the carriage is conveniently a tilting or rocking movement so that part of the carriage lifts to disengage carriage-location means.

In the case of a carriage having only an idler roller or rollers, for use only in supporting a workpiece to be rotated by the driven roller or rollers of another carriage, adjusting movement of the carriage can be effected by manual turning of a roller on its track. The rollers of a rotator are of relatively large diameter and thus afford a substantial mechanical advantage for manual movement of a carriage.

For a driven-roller carriage however, the usual roller drive, such as an electric motor, is used for turning the roller for carriage movement. The speed and direction control of the electric motor or other drive is modified as necessary for carriage adjustment. For example, a pair of driven-roller carriages, on a transverse bed in common, may have a lifting or fixed track rail in common and change-over control means, such as field-reversing switches for electric motors, to enable the carriages to be moved equally and oppositely or individually in either direction.

Means may be provided for mechanically coupling an idler-roller carriage to a driven-roller carriage so as to be adjusted therewith.

The invention is illustrated somewhat diagrammatically by way of example on the accompanying drawings, in which:

FIGS. 1, 2 and 3 are respectively an axial elevation, a plan and a side elevation of a rotator comprising a pair of carriages with a lifting track rail.

FIGS. 4 and 5 are respectively an axial elevation and a side elevation of a single carriage adjustably supportd on a bed above a fixed track rail.

FIG. 6 is an axial elevation, corresponding to FIG. 4, showing the carriage lowered and tilted for adjustment of its position and FIGS. 7 and 8 are fragmentary sectional views on the lines VII—VII of FIG. 6 and VIII—VIII of FIG. 4 respectively.

The rotator shown by FIGS. 1 to 3 has a base consisting of a fabricated channel-frame bed on the transverse members 1 of which a pair of carriages 2 each rest by small idle wheels 3 and a cross-bar 4 which locates the carriage by resting in one pair of a series of upwardly directed notches 5 in a pair of racks 6 on the base members 1.

Each carriage has a roller shaft 7 with a pair of roller tyres 8 for supporting and rotating a workpiece 9. The roller shaft 7 is driven through an overload clutch 10 by an electric motor 11.

A pair of hydraulic jacks 12 carry, on the base beneath the carriages, a track rail 13 which, when lifted by the jacks, contacts a circumferential roller part 14 of the roller shaft 7, between the tyres 8, so that the part 14 can act as a wheel on the track rail 13. The lift of the track rail 13 raises the carriages sufficiently for each locating cross-bar 4 to clear its notches 5 and suitable operation of the electric motors 11 will cause the roller parts 14 to act as driving wheels to move the carriages on the bed to an adjusted position in which they can be lowered, by lowering of the track rail 13 by the jacks 12, and located by the cross-bars 4 in appropriate notches 5.

Instead of the track rail 13 common to both carriages of a pair, a separate track rail, with lifting jacks, could be provided for each carriage so that either carriage may be adjusted independently of the other without the provision of separate electrical control, the roller of any carriage not being adjusted merely turning idly.

The rotator carriage shown by FIGS. 4 to 8 is one of a pair of similar construction and drive to those of FIGS. 1 to 3 but in place of the wheels 3 there is a rotatable eccentric bearer consisting of a stout cross-shaft 15 journalled in the side plates of the carriage 2 and on eccentric journals 15ª on the ends of which are rotatably mounted a pair of wheels 16 which run on a plain extension of the rack 6. The shaft 15 has an operating lever 17 by which it can be turned, from the position shown in FIGS. 4 and 8, to lower the respective end of the carriage 2, as shown in FIGS. 6 and 7, for the circumferential roller part 14 to rest on a fixed track rail 18 whereupon the carriage rocks to lift the locating bar 4 from its notches 5. The maximum distance of the fixed track rail 18 below the roller part 14 is of course not greater than the eccentricity of the journals 15$^a$ of the cross-shaft 15. The electric motor 11 can now be operated for the roller part 14, acting as a driving wheel on the rail 18, to move the carriage to a new position on its bed.

It will be appreciated that any circumferential part rotatable about the roller axis can be used as a wheel for moving a carriage and that by suitable selection of the diameter of such part, and appropriate positioning of the track for engagement therewith, a suitable mechanical advantage or speed ratio for carriage movement can be obtained.

A practical advantage of the invention, particularly when applied to a welding rotator, is that the carriages have a rolling movement and not a sliding movement on guide ways liable to be fouled by weld metal.

I claim:

1. A workpiece rotator comprising a base, at least one pair of carriages relatively movable on said base, a plurality of parallel axes rollers journalled on said carriages to rotatably support a cylindrical workpiece axially parallel to said rollers between said carriages, a track member on said base and extending transversely to the axes of said rollers, and means for effecting engagement and disengagement between said track member and at least one of said rollers which, when in engagement with said track member, serves as a wheel to move at least one of said carriages.

2. A workpiece rotator as claimed in claim 1, in which each said carriage which is movable on said base has means for locating said carriage in adjusted position on said base and said means for effecting said engagement and disengagement serves also for releasing said carriage-locating means.

3. A workpiece rotator as claimed in claim 2, in which said carriage-locating means comprises a cross-bar on the respective carriage, said base has a series of pairs of upwardly directed notches to receive said cross-bar and said means for effecting said engagement and disengagement effects vertical separation of said cross-bar and notches.

4. A workpiece rotator as claimed in claim 1, in which said track member extends horizontally beneath at least one of said carriages and said means for effecting said engagement and disengagement comprise means for lifting said track member into circumferential contact with at least said one of said rollers.

5. A workpiece rotator as claimed in claim 1, in which said track member is a fixed member extending horizontally beneath at least one of said carriages and said means for effecting said engagement comprise a rotatable eccentric bearer supporting said one carriage on said base and means for rotating said bearer to lower said one carriage for a roller thereof to rest on said track member.

6. A workpiece rotator as claimed in claim 5, in which said rotatable eccentric bearer comprises a cross-shaft journalled in said one carriage, an eccentric journal on each end of said cross-shaft, a pair of carriage-supporting wheels rotatably mounted on said journals and resting on said base and means for rotating said cross-shaft.

7. A workpiece rotator comprising a base, a pair of carriages relatively movable on said base, a pair of idle wheels and a cross-bar on each said carriage, respectively supporting and locating said carriage on said base, a pair of racks on said base having a series of pairs of notches in which each said cross-bar respectively engages, a roller shaft journalled in each said carriage, roller tyres on said roller shaft for supporting and rotating a cylindrical workpiece axially parallel thereto and resting thereon, a pair of jacks on said base, and a track rail carried by said jacks and extending horizontally beneath and transverse to the axes of said roller shafts.

8. A workpiece rotator comprising a base, at least one carriage movable on said base, a cross-bar on said carriage, a pair of racks on said base having a series of pairs of notches in which said cross-bar engages, a roller shaft journalled in said carriage, roller tyres on said roller shaft, a cross-shaft journalled in said carriage, an eccentric journal on each end of said cross-shaft, a pair of carriage-supporting wheels rotatably mounted on said journals, a lever on said cross-shaft for rotating said cross-shaft, and a fixed track rail on said base and extending horizontally beneath and transverse to said roller shaft.

9. A workpiece rotator as claimed in claim 1, in which said means for effecting engagement and disengagement comprises means for effecting relative vertical movement of said track member and said one of said rollers.

References Cited in the file of this patent
UNITED STATES PATENTS

| | | |
|---|---|---|
| 951,978 | Willson | Mar. 15, 1910 |
| 1,802,917 | Kennedy | Apr. 28, 1931 |
| 2,653,347 | Diekman | Sept. 29, 1953 |